April 13, 1937. P. MÜLLER 2,076,913
DEVICE FOR RENDERING VISIBLE REFERENCE POINTS IN GEODETIC SURVEYING
Filed Jan. 10, 1935
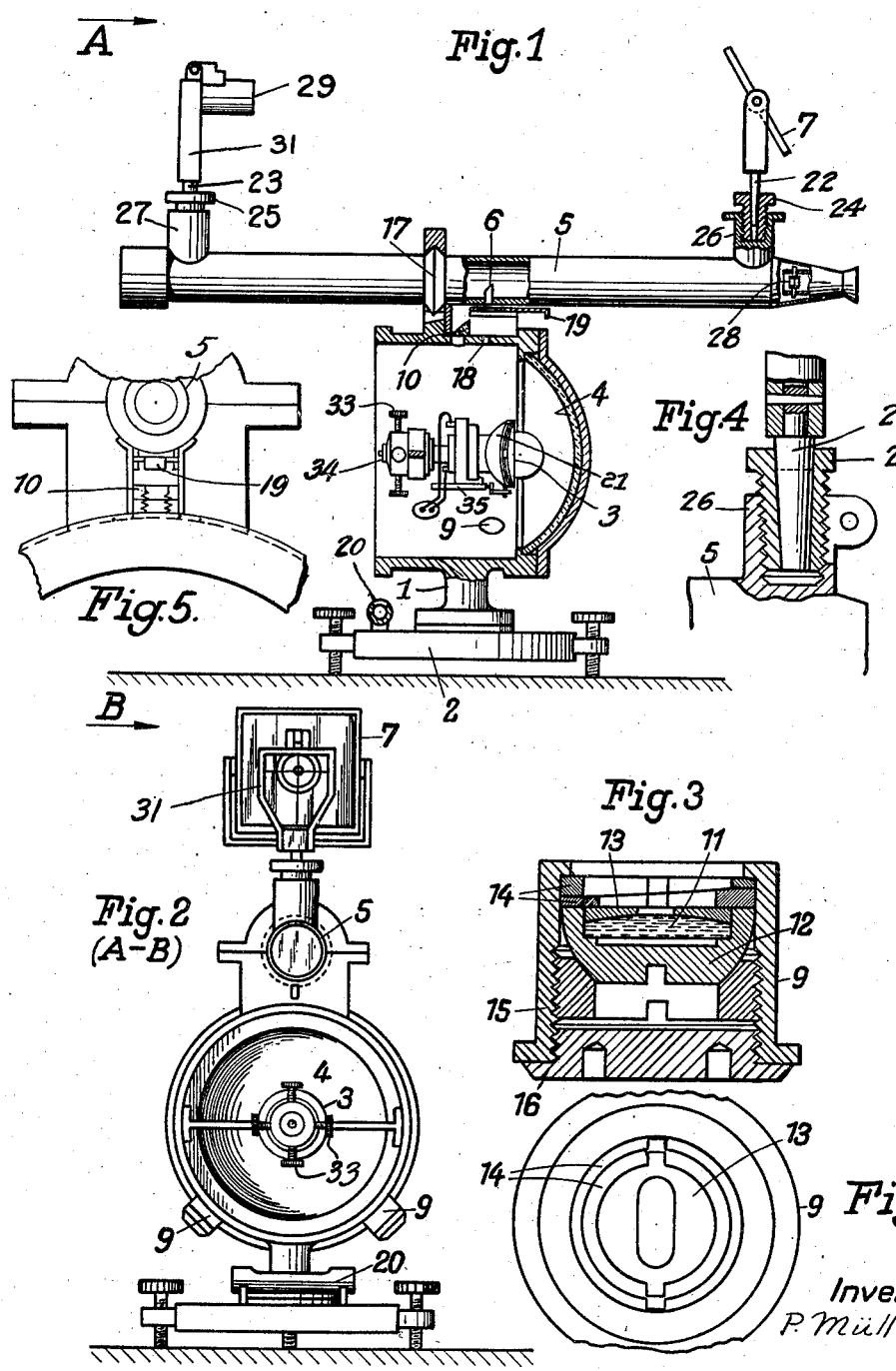
Inventor:
P. Müller Patented Apr. 13, 1937

2,076,913

UNITED STATES PATENT OFFICE 2,076,913

DEVICE FOR RENDERING VISIBLE REFERENCE POINTS IN GEODETIC SURVEYING

Paul Müller, Berlin-Friedrichshagen, Germany, assignor to N. V. Machinerieen-en Apparaten Fabrieken "Meaf", Utrecht, Netherlands Application January 10, 1935, Serial No. 1,244
In Germany January 17, 1934

5 Claims. (Cl. 88—32)

This invention relates to a device for rendering visible reference points in geodetic surveying.

It is known to employ heliotropes requiring sunlight for rendering visible the reference points in geodetic surveying work, and it has been proposed to become independent of sunlight by using artificial illuminants which would permit the continuation of surveying work even in dull weather or at night.

The object of the invention is to provide a small and light instrument of great efficiency, which will meet all conditions. For this purpose a heliotrope, a searchlight and a sighting telescope are combined into a unit in such a way that the heliotrope as well as the searchlight may serve for rendering visible the points to be sighted by their common telescope. The heliotrope may thereby be used in sunny weather while in cloudy weather or at night the searchlight takes over the function of making the point to be explored visible. These three elements are united so that they may be easily separated, but that their relative position can be accurately maintained. For the exact relative adjustment of the parts various suitable means are provided.

By way of example, one embodiment of the invention is illustrated in the accompanying drawing, in which Figure 1 is a side view, partly in section, of the device; Fig. 2, a partial front view thereof in the direction of the arrows A, B, shown in Fig. 1; Fig. 3 shows a sectional elevation and Fig. 3A a plan view of one of the two mirrors which serve for adjusting the axis of the cone of light of the searchlight; Fig. 4 shows on an enlarged scale the attachment of the heliotrope mirror to the sighting telescope; and Fig. 5 shows a diagrammatic front view of a portion of the device.

Referring to the drawing, the foundation of the device is formed by the casing 1 of the searchlight having an adjustable base 2. The casing 1 contains the illuminant 3 and the concave parabolic mirror 4, the illuminant being an incandescent lamp.

The maximum light intensity of the searchlight depends upon the size of the mirror and the temperature of the filament, but its angle of dispersion is determined by the extent of the illuminant. The smaller the latter, the more accurate must be the directional means for providing the distant station with the full light of the searchlight. To comply with these requirements a lamp is chosen having the smallest possible incandescent spiral so as to attain a high output with as little energy as possible. The incandescent filament consists preferably of a cylindrical spiral or coil which, besides, yields a homogeneous area of light. The proportion of the diameter of the cylinder to the length of the filament of the illuminant arranged in the focus of the mirror is so chosen that the coiled filament will appear approximately under the same angle from any point of the mirror, whereby uniform dispersion over the entire area of the mirror is obtained. Very favorable in this respect is the proportion of focal length to the parameter of the parabola, i. e., 1:2.

The casing 1 carries the sighting telescope 5 consisting of two connectible parts. The abutting ends of the telescope are each fitted with a conical annular bead 17 inserted in conical bearing surfaces on the casing 1 to insure accurate position of the axis of the telescope 5 relative to that of the searchlight.

When surveying is done at night and in case of distant stations, the field of vision in the telescope is absolutely dark and the cross wires for sighting are invisible. To illuminate the cross wires 28 in the telescope 5 the top part of the casing 1 of the searchlight is therefore provided with a bore 18 and the superposed portion of the telescope with a passage, so that a few rays from the searchlight can enter the telescope. A small prism rod 6 in the opening of the telescope deflects the ray towards the cross wire plate. To permit adjustment of the intensity of illumination to the degree of brightness, a small slide 19 is provided between the casing 1 of the searchlight and the telescope 5 for brightening the cross wires only enough to render both the distant station and the cross wires visible at the same time.

The slide 19 is attached to the lower side of the telescope in the manner shown in Fig. 5.

The long telescope possessing great definition acts also as carrier for the heliotrope parts. The heliotrope consists of the mirror 7 at one end of the telescope and the cross wire at the other end, which is in the cross wire support 31. Pivoted at the upper end of support 31 is a short tube the front opening of which, directed toward the cross wire, is closed by a wall which is painted white on the side directed toward the interior of the tube 29. At the center of this wall there is a small circular opening the central point of which coincides with the intersecting point of the wires of the cross wire. Mirror 7 also has a circular opening at the center. For actuating the heliotrope the mirror is adjusted manually so that it projects its light on the white front wall of tube 29, so that the dark spot formed by the opening in the mirror registers with the opening in the front wall of tube 29. If the distant station is to be viewed with the telescope the light of the heliotrope falls thereon. To make it possible to bring the axis of the heliotrope into harmony with that of the telescope 5, the conical pins 22, 23 of the mirror and the cross wires are disposed in screw boxes 24, 25 which can be screwed up and down in threaded boxes 26 and 27 and one of which has further an eccentric bore to permit lateral displacement, as indicated in Fig. 4.

To adjust also the axis of the cone of light of the searchlight parallel to that of the telescope, the position of the incandescent lamp adjustably secured for this purpose must be accurately fixed relative to the mirror of the searchlight. This is made possible by two small optical systems 9, Figs. 2 and 3, which are arranged in the casing 1 in such a way that their connecting lines with the illuminant 3 are disposed to one another at about 90° whereby the accurate position of the intersecting point of the two sighting lines is fixed. These systems produce real images of the illuminant side by side on two cross marks on the ground side of a prism 10 arranged in the top of the casing 1 below the telescope 5, so that the observer can conveniently watch the direction in the telescope and the position of the incandescent lamp in the searchlight. The observer then sees on the prism 10 the light filaments of the light source lying adjacently and, if the light source is properly adjusted, the images of the light filaments must register with the cross markings of the prism, as shown diagrammatically on Fig. 5. Prism 10 is conveniently (or preferably) attached to the housing 1 as shown particularly in Figs. 1 and 5. The side of the prism directed toward the searchlight housing is selected as the ground side of the prism, which also contains the cross markings. The optical element of the small projecting devices 9 consists of a plano-convex lens 11, Fig. 3, whose plane side is silvered. This lens 11 is embedded in a ball cup 12 and covered by a diaphragm 13. For the fine focussing of the images on the cross marks of the prism 10 annular wedges 14 which can be moved relative to one another are inserted between the ball cup 12 and its bearing seat so as to adjust the position of the plane side of the lens 11 at will. In proper position, the parts are fixed relative to the ball face of the cup 12 by means of a thrust screw 15, and the entire system is shut off by a covering screw 16.

The angle between the incoming and outgoing ray in the lens mirror will be relatively large and interferes with the sharpness of the images. For this reason the diaphragm must be smallest in the plane where the angle is largest, whereas in all other planes the diaphragm may be larger. The diaphragm, according to the invention, is therefore of slotlike form and its largest extension is positioned rectangularly to the plane of the greatest angle of deflection.

The incandescent lamp with its socket is adjustably arranged and provided with the usual means for fine adjustment. As means for precision adjustment use may be made, as shown in the exemplary embodiment, of four set screws 33 which act on a rectangular member and thereby swing out the incandescent lamp vertically and horizontally. The lamp itself is fitted with a spherical blind diaphragm 21 actuated by a Bowden cable to use the searchlight also as flasher. The incandescent lamp can be fed from a generator combined with an oil engine to form a separate portable unit. In this way the entire outfit is made independent of stationary plants and can be easily carried from one point to the other.

The device has a base which permits accurate adjustment of the axis of the telescope or entire device relative to the distant station. A level 20 in the base serves for making sure that the axes of the searchlight of the sighting telescope and of the heliotrope are in a vertical plane.

I claim:—

1. A device for rendering visible reference points in geodetic surveying, comprising, in combination, a sighting telescope, a heliotrope comprising a heliotrope mirror and heliotrope cross wires, and a searchlight detachably yet positively connected with the telescope, the mirror and cross wires being adjustably connected with the telescope, the telescope consisting of two parts, each of which is provided with a conical annular bead and the searchlight with a two-part bearing having conical bearing surfaces, said bearing being adapted to receive the two annular beads of the parts of the telescope and to hold the latter in position.

2. A device for rendering visible reference points in geodetic surveying, comprising, in combination, a sighting telescope, a heliotrope comprising a heliotrope mirror with frame and a frame containing cross wires, a searchlight detachably yet positively connected with the telescope, the mirror and cross wires of the heliotrope being adjustably connected with the telescope, threaded boxes on both ends of the telescope, screw boxes screwed into said threaded boxes and each provided with a conical bore, conical pins on the frames for the mirror and the cross wires of the heliotrope for connecting the frames with the screw boxes, the bore of one of the screw boxes being eccentric.

3. A device for rendering visible reference points in geodetic surveying, comprising, in combination, a sighting telescope, a heliotrope and a searchlight comprising a casing, a parabolic mirror and an illuminant adjustably arranged in the focus of the mirror, two lens mirrors secured to the casing, a bore in the casing, a prism disposed above the bore and having a dull side and two cross marks, the lens mirrors being arranged so that they produce real images of the illuminant on the cross marks of the prism when the illuminant is exactly in the focus of the parabolic mirror.

4. A device for rendering visible reference points in geodetic surveying, comprising, in combination, a sighting telescope with cross wires, a heliotrope and a searchlight comprising a casing, a parabolic mirror and an illuminant adjustably disposed in the focus of the mirror, and means for illuminating the cross wires in the telescope by the illuminant, said means consisting of a bore in the casing, a superposed bore in the telescope and a deflecting prism above the bore in the telescope.

5. A device for rendering visible reference points in geodetic surveying, comprising, in combination, a sighting telescope, a heliotrope and a searchlight comprising a casing, a parabolic mirror and an illuminant adjustably arranged in the focus of the mirror and a ball blind diaphragm arranged around the illuminant, two lens mirrors secured to the casing, a bore in the casing, a prism disposed above the bore and having a dull side and two cross marks, the lens mirrors being arranged so that they produce real images of the illuminant on the cross marks of the prism when the illuminant is exactly in the focus of the parabolic mirror.

PAUL MÜLLER.